(12) United States Patent
Uchikawa

(10) Patent No.: US 12,348,639 B2
(45) Date of Patent: Jul. 1, 2025

(54) COMMUNICATION APPARATUS, METHOD FOR CONTROLLING COMMUNICATION APPARATUS, AND STORAGE MEDIUM

(71) Applicant: CANON KABUSHIKI KAISHA, Tokyo (JP)

(72) Inventor: Shinichi Uchikawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 246 days.

(21) Appl. No.: 17/929,683

(22) Filed: Sep. 2, 2022

(65) Prior Publication Data
US 2023/0069912 A1 Mar. 9, 2023

(30) Foreign Application Priority Data
Sep. 6, 2021 (JP) .................................. 2021-144485

(51) Int. Cl.
*H04L 9/30* (2006.01)
*G06K 19/06* (2006.01)
*H04L 9/32* (2006.01)
(52) U.S. Cl.
CPC ...... *H04L 9/3234* (2013.01); *G06K 19/06037* (2013.01); *H04L 9/3073* (2013.01)
(58) Field of Classification Search
None
See application file for complete search history.

(56) References Cited

U.S. PATENT DOCUMENTS

| 2009/0103502 | A1* | 4/2009 | Ikeda | ................. | H04W 52/245 |
| | | | | | 370/338 |
| 2009/0129354 | A1* | 5/2009 | Gupta | .................. | H04W 24/02 |
| | | | | | 370/338 |
| 2017/0295448 | A1 | 10/2017 | McCann et al. | | |
| 2019/0182037 | A1* | 6/2019 | Sakumoto | ............ | H04L 9/3218 |
| 2019/0306019 | A1* | 10/2019 | Sakai | ................. | H04L 41/0806 |
| 2019/0356482 | A1* | 11/2019 | Nix | ...................... | H04W 12/041 |
| 2019/0361642 | A1* | 11/2019 | Shibata | ................. | G06F 3/1236 |
| 2020/0154276 | A1* | 5/2020 | Minakawa | ............ | H04W 76/10 |
| 2021/0099305 | A1* | 4/2021 | Shibata | ............... | H04L 63/0853 |

* cited by examiner

*Primary Examiner* — Christopher B Robinson
(74) *Attorney, Agent, or Firm* — Canon U.S.A., Inc. IP Division

(57) ABSTRACT

A communication apparatus includes a generation unit configured to generate a new pair of a public key and a secret key paired with the public key in a case where a predetermined condition is satisfied, a provision unit configured to externally provide information including at least the public key generated by the generation unit, a first reception unit configured to receive, from an external apparatus after the information is provided by the provision unit, an authentication request including information generated using at least the public key, a transmission unit configured to transmit, to the external apparatus, an authentication response as a response to the authentication request in a case where the authentication request is received, and a second reception unit configured to receive, from the external apparatus after the authentication response is transmitted to the external apparatus, configuration information including a communication parameter.

23 Claims, 11 Drawing Sheets

COMMUNICATION APPARATUS, METHOD FOR CONTROLLING COMMUNICATION APPARATUS, AND STORAGE MEDIUM

BACKGROUND

Field

The present disclosure relates to a communication apparatus that communicates with an external apparatus, a method for controlling the communication apparatus, and a storage medium.

Description of the Related Art

In recent years, many digital cameras, printers, mobile phones, and smartphones include a wireless communication function, and the communication apparatuses are often connected to a wireless network while in use.

In order to connect a communication apparatus to a wireless network, various communication parameters such as an encryption method, an encryption key, an authentication method, and an authentication key need to be set. As a technology for facilitating the setting of the communication parameters, a standard (Wi-Fi® Device Provisioning Protocol, hereinafter "DPP") for setting the communication parameters using a quick response code (QR Code®) has been developed.

United States Patent Application Publication No. 2017/0295448 discusses a system by which a configurator providing communication parameters provides an enrollee with necessary information for connecting to an access point.

In setting communication parameters using DPP, the configurator analyzes a QR code image provided by the enrollee, decodes encoded information, and acquires bootstrapping information embedded as QR code information.

The enrollee that receives the communication parameters uses a public key (also referred to as "bootstrapping key") for authentication included in the bootstrapping information to check the validity of the configurator that provides the communication parameters. In DPP communication, the configurator transmits a hash value of the public key for authentication to the enrollee, and the enrollee authenticates the configurator by checking whether the received hash value of the public key matches a hash value of a public key of the enrollee. In a case where the configurator is successfully authenticated, the configurator transmits necessary information for connecting to an access point to the enrollee. As a result, the enrollee receives the necessary information for connecting to the access point from the configurator and can connect to the access point using the received information.

As described above, in DPP, the enrollee authenticates the configurator using the hash value of the public key (bootstrapping key) for authentication. Thus, a user with the public key of the enrollee can establish direct communication for sharing parameters with the enrollee by operating the configurator using the public key.

Specifically, one of the criteria for configurator authentication that is used in DPP is that the configurator and the enrollee are close enough to each other for the configurator to physically read a QR code including the public key of the enrollee for authentication.

Meanwhile, in a case where a pair of a public key and a secret key that are stored in advance at the time of shipment are used as the public key for authentication in DPP and are also used in other authentication processing, a third party may easily obtain the public key through another path. In such a case, the third party with the public key may perform an unintended setup of the enrollee. Further, in a case where a setup using DPP is previously performed on a device, a public key stored in advance is previously shared with a specific user. The user having performed a setup previously may erroneously perform unintended setup processing again.

SUMMARY

One feature of various embodiments of the present disclosure is directed to providing a system for appropriately generating a pair of a public key and a secret key for use in sharing communication parameters using a configurator in a communication apparatus functioning as an enrollee. Another feature of various embodiments of the present disclosure is directed to increasing security in sharing the communication parameters.

According to one embodiment of the present disclosure, a communication apparatus is provided that includes a generation unit configured to generate a new pair of a public key and a secret key paired with the public key in a case where a predetermined condition is satisfied, a provision unit configured to externally provide information including at least the public key generated by the generation unit, a first reception unit configured to receive, from an external apparatus after the information is provided by the provision unit, an authentication request including information generated using at least the public key, a transmission unit configured to transmit, to the external apparatus, an authentication response as a response to the authentication request in a case where the authentication request is received, and a second reception unit configured to receive, from the external apparatus after the authentication response is transmitted to the external apparatus, configuration information including a communication parameter.

Further features of the present disclosure will become apparent from the following description of example embodiments with reference to the attached drawings.

DESCRIPTION OF THE EMBODIMENTS

Various example embodiments of the present disclosure will be described below with reference to the drawings. It should be noted that the example embodiments described below are not intended to limit the scope of the claimed invention and that not all combinations of features described in the example embodiments are always essential to a technical solution of the present disclosure.

Figure 1:
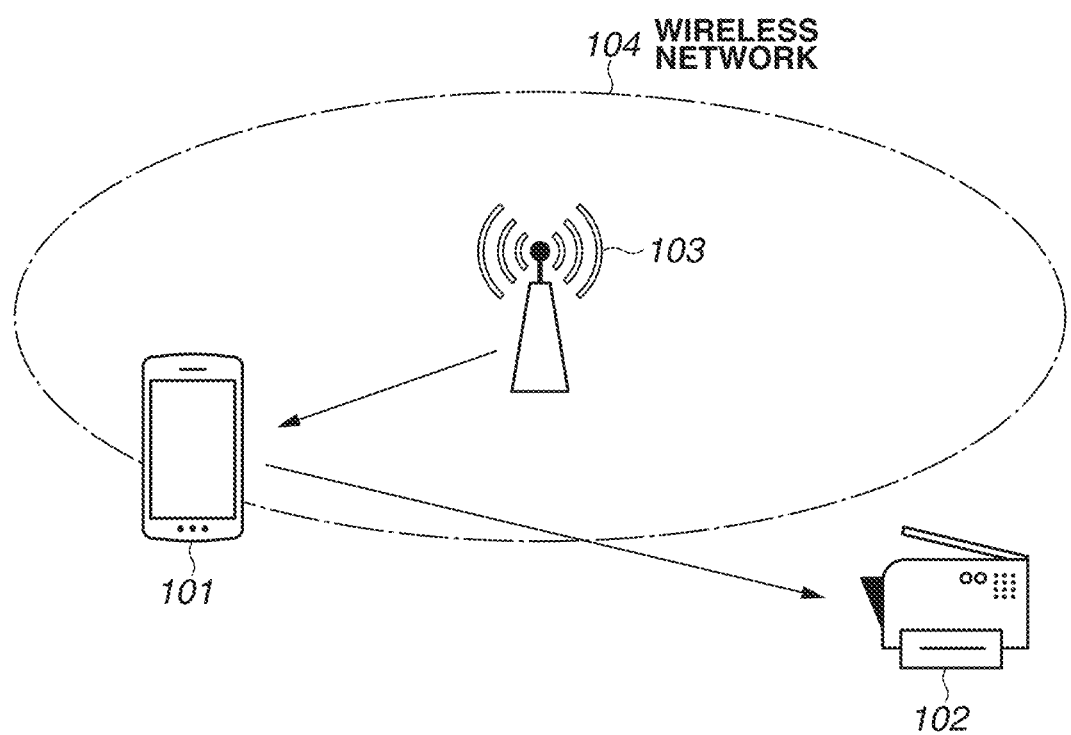
FIG. 1 is a diagram illustrating an example of a communication system according to one example embodiment.

First, a configuration of a communication system according to a first example embodiment will be described below with reference to FIG. 1. The communication system according to the present example embodiment includes communication apparatuses 101 and 102 and an access point 103. The communication apparatuses 101 and 102 and the access point 103 each include a wireless local area network (wireless LAN) communication function. The communication apparatuses 101 and 102 each operate as a station (STA) that joins a wireless network 104 provided by the access point 103. Further, the access point 103 operates as an access point (AP) that forms a wireless network.

The communication apparatuses 101 and 102 and the access point 103 each support at least one of the Institute of Electrical and Electronics Engineers (IEEE) 802.11a/b/g/n/a/ax/be standards, which are the IEEE 802.11 wireless communication standards.

Further, the communication apparatus 101 operates as a configurator in accordance with the Wi-Fi® Device Provisioning Protocol (DPP) standard and operates as a provision apparatus that provides communication parameters to other apparatuses. Further, the communication apparatus 102 and the access point 103 each operate as a DPP enrollee and operate as a reception apparatus that receives communication parameters from other apparatuses. The communication apparatus 101 shares the communication parameters with the communication apparatus 102 and the access point 103 as described above to communicate with the communication apparatus 102 on the wireless network 104 formed by the access point 103. The communication apparatus 101 can, but does not have to, connect to the wireless network 104 formed by the access point 103. DPP is an example of a predetermined wireless setup standard.

Specific examples of the communication apparatus 101 that functions as a configurator according to the present example embodiment include, but are not limited to, mobile terminals such as smartphones and tablet devices, wearable terminals such as smart watches and smart glasses, and personal computers (PCs). The communication apparatus 101 can be an electronic device that is connectable to a wireless network and includes a camera for capturing images of nearby areas. Further, specific examples of the communication apparatus 102 that functions as an enrollee according to the present example embodiment include, but are not limited to, multi-function peripherals (MFPs) that include a plurality of functions such as a print function, a scan function, and a copy function. The communication apparatus 102 can be a single-function printer including a print function or a single-function scanner device including a scan function. Further, the communication apparatus 102 can be an electronic device such as a digital camera, a signage device, or a medical device. The communication apparatus 102 is to include an output unit that is connectable to a wireless network and outputs a quick response code (QR Code®) so that an external apparatus can read the QR code. According to the present example embodiment, for example, the communication apparatus 102 outputs a QR code by displaying the QR code on an operation unit 211 of the communication apparatus 102.

At least one of the communication apparatuses 101 and 102 and the access point 103 can support another standard such as Wi-Fi Direct® or Wi-Fi Aware™ in addition to the DPP standard.

According to the present example embodiment, the communication apparatus 102 functioning as an enrollee provides the communication apparatus 101 with a two-dimensional code including a public key (bootstrapping key) for use in authentication for performing DPP communication. The two-dimensional code is, for example, a two-dimensional code based on the QR code standard. Hereinafter, a case where a QR code is displayed as an example of a two-dimensional code will be described below.

In setting communication parameters using DPP, the communication apparatus 101 as a configurator analyzes an image of a QR code provided by the communication apparatus 102 as an enrollee. By analyzing the image, the communication apparatus 101 decodes encoded information and acquires bootstrapping information embedded as QR code information. The enrollee that receives the communication parameters uses the public key (bootstrapping key) for authentication included in the bootstrapping information to check the validity of the configurator that provides the communication parameters. In DPP communication, the configurator transmits a hash value of the public key for authentication to the enrollee, and the enrollee authenticates the configurator by checking whether the received hash value of the public key matches a hash value of a public key of the enrollee. In a case where the configurator is successfully authenticated, the configurator transmits configuration information to the enrollee. The configuration information includes communication parameters for connecting to the access point. As a result, the enrollee receives the information for connecting to the access point from the configurator and connects to the access point using the received information.

As described above, in DPP, the enrollee authenticates the configurator using the hash value of the public key (bootstrapping key) for authentication. Thus, a user with the public key of the enrollee can establish DPP communication for sharing parameters with the enrollee by operating the configurator using the public key.

Specifically, one of criteria for configurator authentication that are used in DPP is that the configurator and the enrollee are close enough to each other for the configurator to physically read a QR code including the public key of the enrollee for authentication.

Meanwhile, in a case where a pair of a public key and a secret key that are stored in advance at the time of shipment are used as the public key for authentication in DPP and are also used in other authentication processing, a third party may easily obtain the public key through another path. In such a case, the third party with the public key may perform an unintended setup of the enrollee. Further, in a case where a setup using DPP is previously performed on a device, a public key stored in advance is previously shared with a specific user. The user having performed a setup previously may erroneously perform unintended setup processing again.

Thus, the present example embodiment provides a system for appropriately generating a pair of a public key and a secret key for use in performing wireless setup processing based on DPP in the communication apparatus 102 functioning as an enrollee. This will be described specifically below.

<Hardware Configuration of Communication Apparatus 102>

Figure 2:
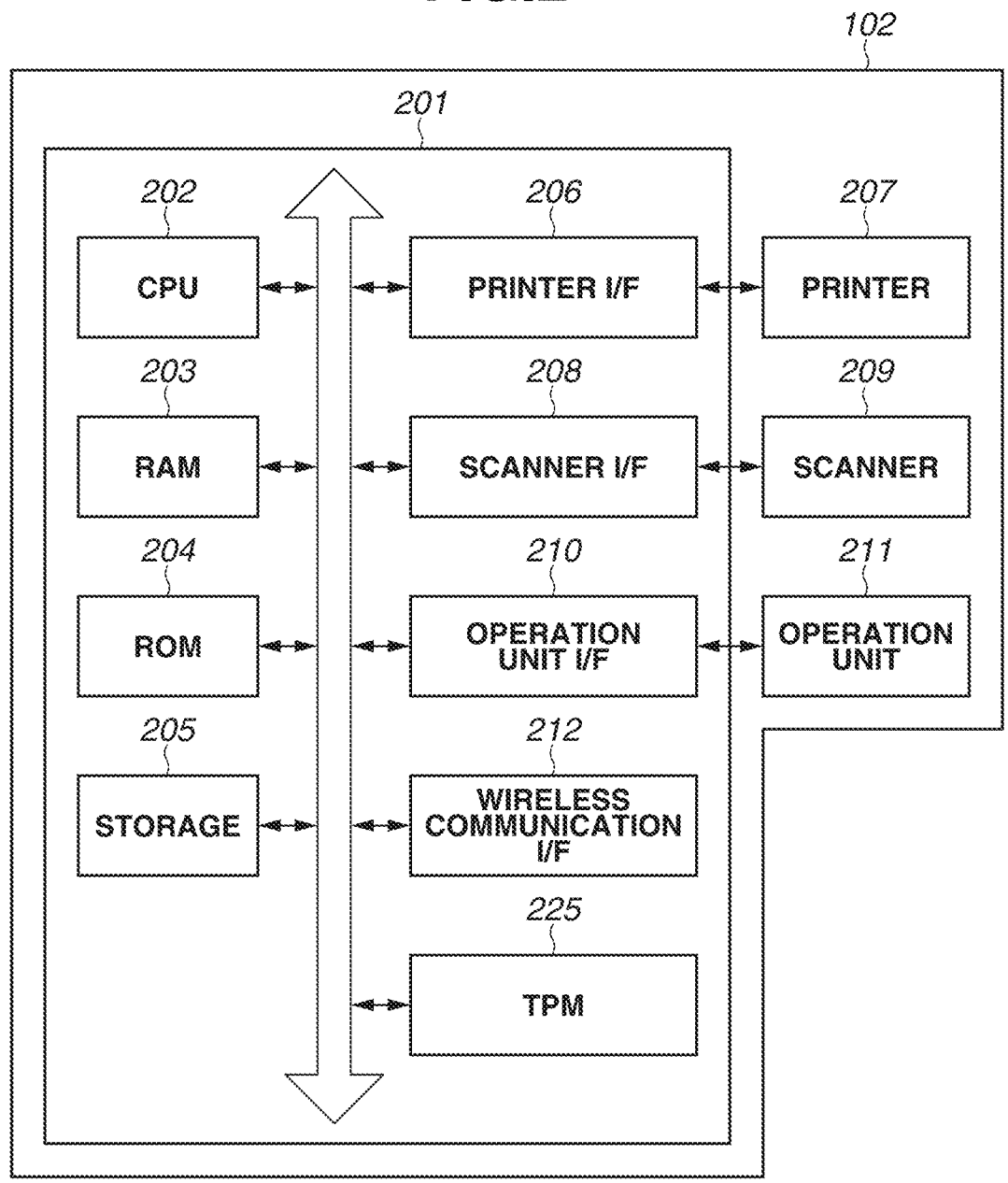
FIG. 2 is a diagram illustrating an example of a hardware configuration of a communication apparatus according to one example embodiment.

Next, a hardware configuration of the communication apparatus 102 will be described below with reference to FIG. 2. FIG. 2 is a block diagram illustrating a hardware configuration of the communication apparatus 102. The communication apparatus 102 includes a reading function of reading an image on a sheet, a copy function of printing the scan image on a sheet, and a file transmission function of transmitting a file to an external communication apparatus. The communication apparatus 102 further includes a print function of printing a print image generated based on externally-received print data on a sheet. Further, the communication apparatus 102 includes a user authentication function so that only a user having input authentication information and having successfully logged in to the communication apparatus 102 can use the copy function and the scan function.

A control unit 201 includes a central processing unit (CPU) 202 and controls operations of the entire communication apparatus 102. The CPU 202 reads a control program stored in a read-only memory (ROM) 204 or a storage 205 and performs various types of control such as print control and reading control. The ROM 204 stores a boot program and control programs that are executable by the CPU 202. A random access memory (RAM) 203 is a main storage memory of the CPU 202 and is used as a work area or a temporary storage area for loading various control programs. The storage 205 stores print data, image data, various programs, various types of settings information, and an operating system (OS). While the storage 205 is an auxiliary storage device such as a hard disk drive (HDD) according to the present example embodiment, a non-volatile memory such as a solid state drive (SSD) can be used instead of the HDD.

In activating the communication apparatus 102, the CPU 202 executes the boot program stored in the ROM 204. The boot program is for reading a program of the OS stored in the storage 205 and loading the read program on the RAM 203. Following the execution of the boot program, the CPU 202 executes the program of the OS loaded on the RAM 203 and controls the communication apparatus 102. Further, the CPU 202 loads various types of data and various programs on the RAM 203 and performs control illustrated in below-described flowcharts. As described above, the hardware of the CPU 202, the ROM 204, and the RAM 203 forms a computer.

While the single CPU 202 performs the processes illustrated in the below-described flowcharts using a single memory (the RAM 203) in the communication apparatus 102 according to the present example embodiment, another form can be employed. For example, a plurality of CPUs, a plurality of RAMs, a plurality of ROMs, and a plurality of storages can collaborate together to perform the processes illustrated in the below-described flowcharts. Further, part of the processes such as data transmission and reception is realized in collaboration with a hardware circuit of a communication interface. Further, print image generation processing can be realized in collaboration with a dedicated hardware circuit (not illustrated). Further, actual print processing and scan processing are realized in collaboration with a hardware configuration described below.

An operation unit interface (operation unit I/F) 210 connects the operation unit 211 and the control unit 201 together.

The operation unit 211 includes various hardware keys and a liquid crystal display unit having a touch panel function.

The operation unit 211 functions as a display unit that displays information to a user and displays a QR code based on the DPP standard. The operation unit 211 also functions as a reception unit that receives user instructions.

A trusted platform module (TPM) 225 is a tamper-resistant memory unit that prevents stored data from being read externally to process or store confidential information. According to the present example embodiment, a secret key and a public key for use in DPP and a certificate for use in communication with another external service are stored. The data encoding and decoding using the certificate and the keys, key pair generation, hash value calculation, digital signature generation processing, and verification processing are also performed by the TPM 225 and the CPU 202 in collaboration with each other.

A scanner interface (scanner I/F) 208 connects a scanner 209 and the control unit 201 together. The scanner 209 scans a document placed on a platen glass or an automatic document feeder (ADF) and generates a scan image. The generated scan image is stored in the storage 205 or the RAM 203. The scan image generated by the scanner 209 is transmitted to an external apparatus such as the communication apparatus 101 via a network such as the wireless network 104 and is used to print the image on a sheet.

A printer interface (printer I/F) 206 connects a printer 207 and the control unit 201 together. The communication apparatus 102 transfers a print image and a control command for controlling the printer 207 to the printer 207 via the printer I/F 206. The print image is generated based on a print job received via a network such as the wireless network 104 or is generated based on a scan image scanned by the scanner 209.

The printer 207 receives the print image and the control command via the control unit 201 and prints a print image on a sheet fed from a sheet storage unit (not illustrated). The printer 207 can use an electrophotographic printing method or an inkjet printing method. A printed material (sheet) after the printing by the printer 207 is completed is discharged to a sheet discharge tray (not illustrated).

Next, a wireless communication interface (wireless communication I/F) 212 for external wireless communication will be described below. The wireless communication I/F 212 is a communication interface that includes an antenna for wireless communication based on the IEEE 802.11 series standard and a circuit for communication. Further, the wireless communication I/F 212 supports frame transmission and reception defined in the DPP standard. The CPU 202 of the communication apparatus 102 collaborates with the wireless communication I/F 212 and performs wireless communication transmission and reception for DPP described below. Further, the communication apparatus 102 communicates print jobs and content data such as scan data with another communication apparatus via the wireless communication I/F 212.

<Software Configuration of Communication Apparatus 102>

Figure 3:
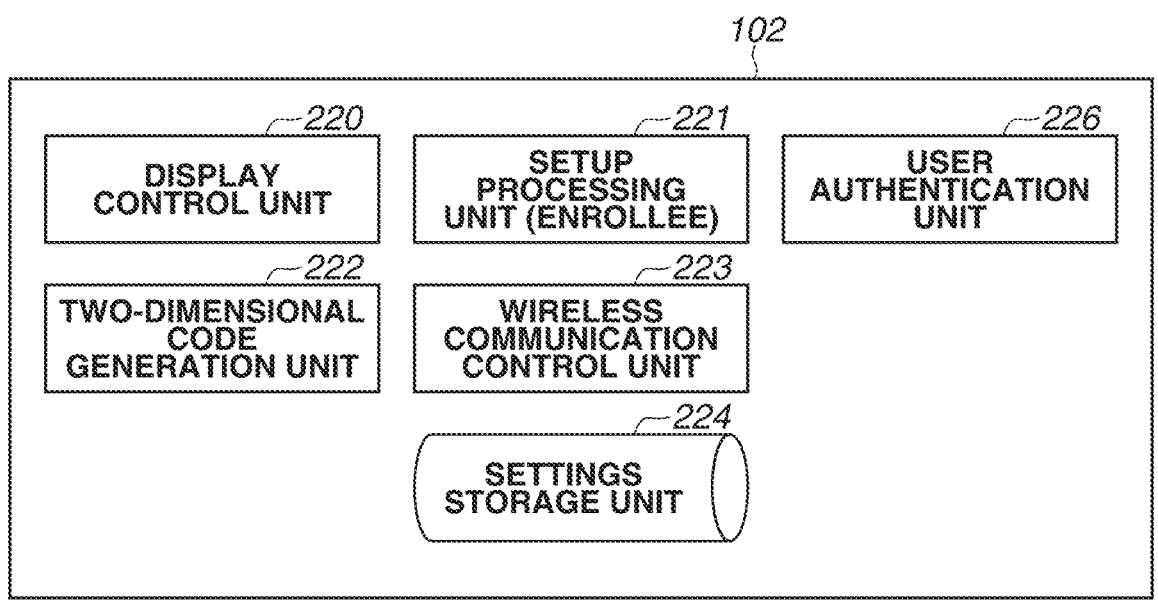
FIG. 3 is a diagram illustrating an example of a software configuration of the communication apparatus according to one example embodiment.

FIG. 3 is a block diagram illustrating an example of a software configuration of the communication apparatus 102. Each software module is stored as a program in the storage 205 of the communication apparatus 102, and the program is read to the RAM 203 as needed and executed by the CPU 202. Due to sheet limitation, FIG. 3 illustrates an extracted portion of the software configuration that relates to communication control as a feature of the present disclosure.

Specifically, modules for print processing, scan processing, and copy processing are omitted as needed in FIG. 3.

Figure 8:
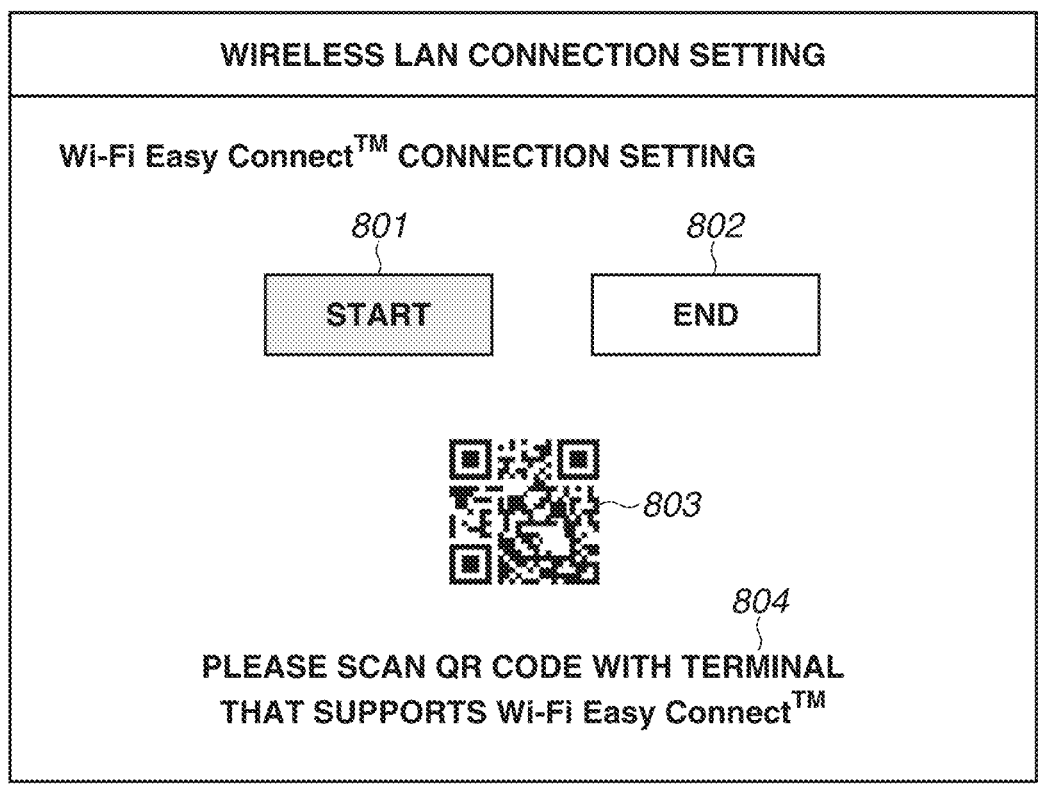
FIG. 8 illustrates an example of a screen displayed on an operation unit of a communication apparatus according to one example embodiment.

A display control unit 220 generates an operation screen for the scan function and the copy function of the operation unit 211, a setting screen including a QR code described below with reference to FIG. 8, and other setting screens. Further, the display control unit 220 displays the generated operation screen or the generated setting screen on a touch panel display of the operation unit 211 in collaboration with the operation unit 211.

A setup processing unit 221 (hereinafter, also referred to sometimes as "processing unit 221") as an enrollee provides various types of control for performing the wireless setup processing based on the DPP standard. This will be described specifically below. The processing unit 221 transmits and receives wireless communication frames for DPP in collaboration with a wireless communication control unit 223 and the wireless communication I/F 212. The wireless communication control unit 223 also provides a control function as a wireless child device. Specifically, after the setup processing is completed and a connection is successfully established with an external access point, wireless communication frames are transmitted to and received from the external access point. Through the wireless communication, the communication apparatus 102 communicates print jobs and content data such as scan data with other communication apparatuses.

The wireless setup processing based on the DPP standard will be described further below. The processing unit 221 collaborates with the TPM 225 and generates a public key for use in DPP and a secret key paired with the public key. The TPM 225 manages the generated public key and the generated secret key. The processing unit 221 functions as a network service of waiting in a standby state for an authentication request based on the DPP standard from a configurator (e.g., the communication apparatus 101). An authentication request transmitted from the configurator is encoded data that uses the public key of the enrollee and includes the hash value of the bootstrapping key of the configurator, a protocol key of the configurator, and a nonce.

The processing unit 221 collaborates with the TPM 225 and attempts to develop the encoded data included in the authentication request using the secret key for use in DPP. In a case where the encoded data is successfully developed, a DPP authentication response including the protocol key is transmitted to the configurator based on information acquired as a result of the development. The configurator derives a value referred to as "I-auth" based on data included in the authentication response and authenticates the enrollee by comparing the derived value with an "I-auth" value stored in advance in the configurator. In a case where the enrollee is successfully authenticated, the communication apparatus 102 as the enrollee and the configurator can communicate configuration information based on the DPP standard using a common encryption key generated based on the protocol key. The processing unit 221 attempts to connect to an external access point such as the access point 103 based on the configuration information received from the configurator.

The configuration information includes a service set identifier (SSID) necessary for connecting to an access point, an encoding method, an encryption key, an authentication method, and channel information. Further, the configuration information includes an authentication and key management type (AKM) value indicating which authentication protocol and which key exchange algorithm are to be used in communication.

Further, in a case where the setup processing based on the DPP standard is completed or stopped, the processing unit 221 performs end processing to end the setup processing. In the end processing, control for disposing of the secret key and the public key that are generated for DPP and control for stopping the network service of waiting for an authentication request are performed.

The wireless communication control unit 223 collaborates with the wireless communication I/F 212 and communicates wireless frames with the external access point and the DPP configurator.

A two-dimensional code generation unit 222 (hereinafter, also referred to sometimes as "generation unit 222") collaborates with the processing unit 221 and the TPM 225 and generates a QR code image for use in DPP bootstrapping. The generation unit 222 generates identification information and a QR code image storing at least the public key for use in DPP. The identification information indicates that the corresponding data stores DPP information. Further, the QR code image can include a media access control (MAC) address of the wireless communication I/F 212 and channel information indicating a wireless channel for waiting for an authentication request. The QR code image generated by the generation unit 222 is stored in a settings storage unit 224. The display control unit 220 reads the QR code image generated by the generation unit 222 and displays the setting screen described below on the operation unit 211. As described above, according to the present example embodiment, the public key for use in DPP is externally provided by displaying the QR code including the public key on the operation unit 211. Specifically, the touch panel display of the operation unit 211 functions as a provision unit that provides the public key to an external apparatus.

The settings storage unit 224 stores the QR code image and various operation settings of the communication apparatus 102. The operation settings include a setting for selecting whether to enable the user authentication function. A case where the setting that enables the user authentication function is selected and this operation setting is stored in the settings storage unit 224 will be described below as an example according to the present example embodiment.

A user authentication unit 226 (hereinafter, also referred to sometimes as "authentication unit 226") includes an account management function of managing accounts of users of the communication apparatus 102 and a login function of logging in a user having been authenticated successfully by a communication apparatus.

In a case where the user authentication function is enabled, the authentication unit 226 collaborates with the display control unit 220 and displays a login screen on the operation unit 211. The user inputs user account information such as user identification (user ID) and password via the login screen (not illustrated) and performs a login operation. In a case where the login operation is detected, the authentication unit 226 authenticates the user based on the entered account information. In a case where the user is successfully authenticated, the corresponding user is logged in to the communication apparatus 102.

The account management function also manages privileges of the users in addition to the accounts of the users. A case where an administrator-privilege user having an administrator privilege of being allowed to change the operation settings, at least network settings, of the communication apparatus 102 and general-privilege users are managed will be described below as an example according to the present example embodiment.

The general-privilege users are users allowed to use general functions provided by the communication apparatus 102, such as the copy function and the scan function, but not allowed to change the network settings. According to the present example embodiment, an administrator performs display control so that a screen for the setup processing based on the DPP standard is displayed only in a case where a logged-in user is a user having the administrator privilege in order to prevent an unintended change to the network settings. Details thereof will be described below.

<Hardware Configuration of Communication Apparatus 101>

Figure 4:
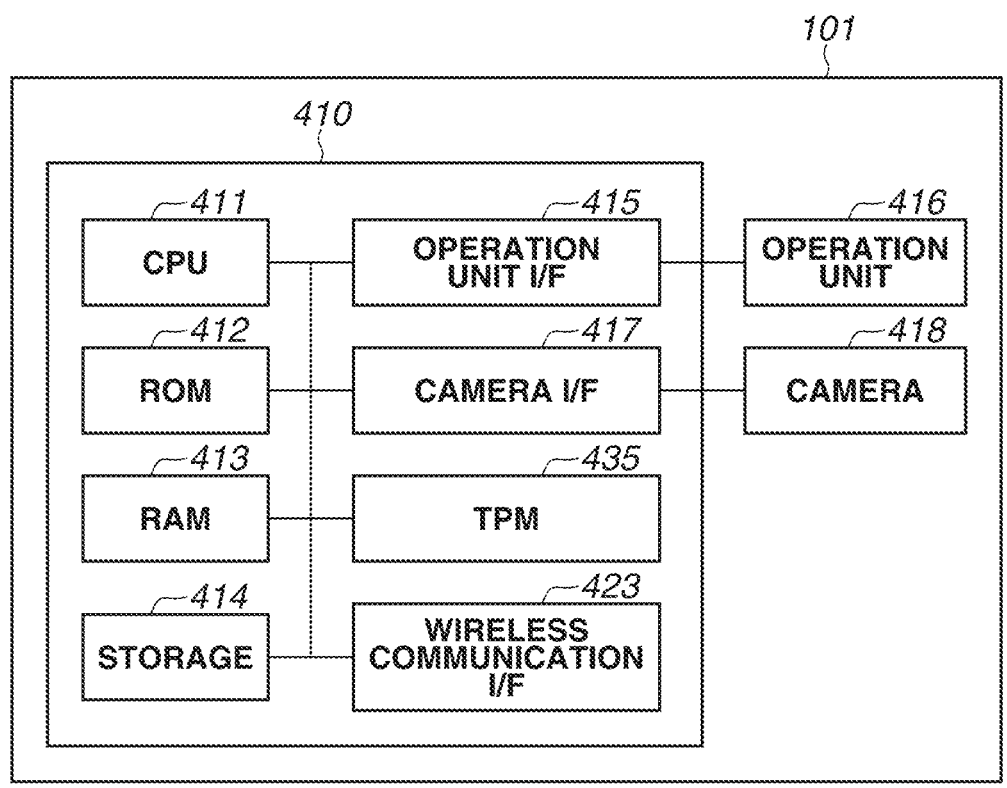
FIG. 4 is a diagram illustrating an example of a hardware configuration of another communication apparatus according to one example embodiment.

Next, a hardware configuration of the communication apparatus 101 functioning as a configurator will be described below with reference to FIG. 4. FIG. 4 is a block diagram illustrating a hardware configuration of the communication apparatus 101. A control unit 410 includes a CPU 411 and controls operations of the entire communication apparatus 101. Hardware and interfaces of the control unit 410 are communicably connected together via a system bus. The CPU 411 reads control programs stored in a ROM 412 or a storage 414 and performs various types of control. The ROM 412 stores control programs that are executable by the CPU 411. A RAM 413 is a main memory that the CPU 411 accesses. The RAM 413 is used as a work area or a temporary memory area for developing various control programs. The storage 414 is a non-volatile flash memory that is larger in capacity than the RAM 413. The storage 414 stores a program for a function as a configurator and a program for control to read a two-dimensional code image and decode information included in the two-dimensional code. The CPU 411 executes a boot program stored in the ROM 412 in activating the communication apparatus 101. The boot program is for reading the program of the OS stored in the storage 414 and loading the read program on the RAM 413. Following the execution of the boot program, the CPU 411 executes the program of the OS loaded on the RAM 413 and controls the communication apparatus 102. Further, the CPU 411 also loads various types of data on the RAM 413 and performs reading and writing. As described above, the hardware such as the CPU 411, the ROM 412, the RAM 413, and the storage 414 forms a computer.

The single CPU 411 of the communication apparatus 102 is to perform control relating to DPP described below. Alternatively, another form can be employed. For example, a plurality of processors and a plurality of memories can operate together to perform the processes illustrated in the flowcharts described below. Further, part of the processes such as data transmission and reception are realized in collaboration with a hardware circuit of a wireless communication I/F 423.

An operation unit I/F 415 connects an operation unit 416 and the control unit 410 together. The operation unit 416 includes a touch panel display that detects user touch operations and presents an operation screen to a user. The operation unit 416 functions as a display unit that displays information and functions as a reception unit that receives user instructions. Further, a user can input a desired operation instruction to the communication apparatus 101 by performing a touch operation on the operation unit 416 using an object such as fingers.

A camera interface (camera I/F) 417 connects the control unit 410 and a camera 418 together. The camera 418 captures still images and moving images. Image data acquired by imaging by the camera 418 is temporarily stored in the RAM 413 or is stored in the storage 414.

The wireless communication I/F 423 is a communication interface that includes an antenna for performing wireless communication based on the IEEE 802.11 series standard and a circuit for communication. Further, the communication interface supports transmission and reception of frames defined in the DPP standard. The CPU 202 of the communication apparatus 102 collaborates with the wireless communication I/F 423 and performs wireless communication transmission and reception for DPP described below. Further, the communication apparatus 102 transmits and receives print jobs and content data such as scan data to and from another communication apparatus, such as the communication apparatus 101, via the wireless communication I/F 423.

A TPM 435 is a tamper-resistant memory unit similar to the TPM 225. According to the present example embodiment, a secret key and a public key for use in DPP and a certificate for use in communication with another external service are stored. The data encoding and decoding using the certificate and the keys, key pair generation, hash value calculation, digital signature generation processing, and verification processing are also performed by the TPM 435 in collaboration with the CPU 411.

<Software Configuration of Communication Apparatus 101>

Figure 5:
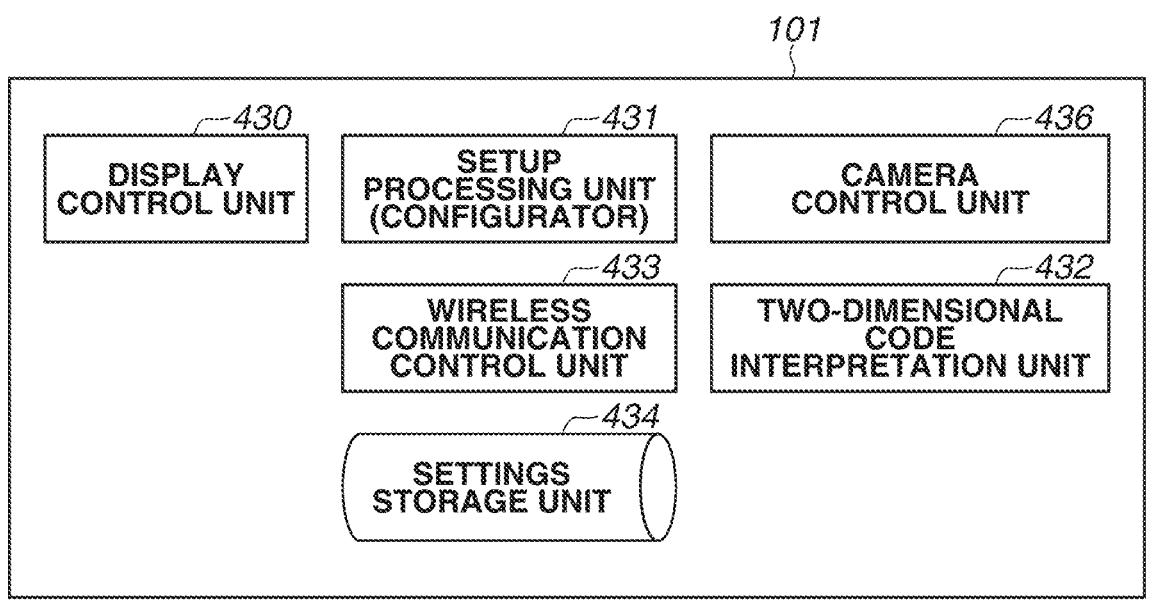
FIG. 5 is a diagram illustrating an example of a software configuration of the other communication apparatus according to one example embodiment.

Next, a software configuration of the communication apparatus 101 will be described below with reference to FIG. 5. FIG. 5 is a block diagram illustrating a software configuration of the communication apparatus 101. Each software module is stored as a program in the storage 414 of the communication apparatus 102, and the program is read to the RAM 413 as needed and executed by the CPU 411. Due to sheet limitation, FIG. 5 illustrates an extracted portion of the software configuration that relates to communication control as a feature of the present disclosure.

A display control unit 430 collaborates with the operation unit 416 and provides various setting screens and operation screens. Specifically, the display control unit 430 displays a screen for scanning a two-dimensional code and a screen for prompting the user to select configuration information to be provided to an enrollee.

A wireless communication control unit 433 collaborates with the wireless communication I/F 423 and transmits and receives wireless frames to and from an external access point and a DPP enrollee.

A setup processing unit 431 (hereinafter, also referred to sometimes as "processing unit 431") as a configurator provides various types of control for performing the wireless setup processing based on DPP. The processing unit 431 collaborates with a camera control unit 436 and a two-dimensional code interpretation unit 432 (hereinafter, also referred to sometimes as "interpretation unit 432") and acquires bootstrapping information such as a public key by scanning a QR code of an enrollee. The processing unit 431 requests the two-dimensional code interpretation unit 432 to scan the QR code. The interpretation unit 432 having received the request collaborates with the camera control unit 436 and the camera 418 and controls QR code reading. An image captured by the camera control unit 436 is stored in the RAM 413. The interpretation unit 432 analyzes the image and attempts to decode information included in the QR code. In a case where the interpretation unit 432 successfully decodes information, the interpretation unit 432 notifies the processing unit 431 of the decoded information as an interpretation result. On the other hand, in a case where the decoding is unsuccessful, the image capturing and the image analysis are repeated for a predetermined time (e.g., 10 seconds). In a case where the decoding of information is unsuccessful after the predetermined time elapses, the interpretation unit 432 notifies the processing unit 431 of an error as an interpretation result.

The processing unit 431 having received an interpretation result determines whether the interpretation result includes bootstrapping information. In a case where the processing unit 431 determines that the interpretation result includes bootstrapping information, the processing unit 431 collaborates with the TPM 435 and generates an authentication request described above based on a public key of the bootstrapping information. On the other hand, in a case where the interpretation result includes no bootstrapping information, the processing unit 431 collaborates with the display control unit 430 and provides a setting error notification.

The processing unit 431 collaborates with the wireless communication control unit 433 and transmits an authentication request to the enrollee. A transmission destination of a wireless frame indicating the authentication request is determined based on the MAC address of the enrollee and the wireless channel information that are included in the bootstrapping information. Hereinafter, the processing unit 431 receives an authentication response described above and performs authentication processing using "I-auth". In a case where the authentication is successful, the processing unit 431 displays a setting screen for receiving selection of an external access point to be included in the configuration information. The screen displays a search result list of access points detected as a result of searching for nearby access points by the wireless communication control unit 433. The user selects an external access point that the enrollee is to join from the search result list. An SSID of an external access point to be included in the configuration information is determined based on the selection. A user can manually input authentication information such as a passkey. Further, in collaboration with the OS, the processing unit 431 can check whether the external access point is an external access point to which the communication apparatus 101 previously connected, and authentication information such as a passkey used in the previous connection can be used. In this case, the OS identifies a passkey of an external access point used in a previous connection based on connection history information stored in settings storage unit 434.

In collaboration with the OS of the communication apparatus 102, an external access point to which the communication apparatus 102 is currently connected can be selected provisionally as a candidate external access point to be included in the configuration information. In this case, an external access point that the user is currently using is provisionally selected as a candidate, so that an operation of selecting an external access point from the list can be skipped.

Lastly, the processing unit 431 transmits configuration information for connecting to the external access point selected via the wireless communication control unit 433 to the enrollee that is a counterpart device of the successful authentication.

The configuration information includes an SSID that identifies the external access point, an encoding method, an encryption key, an authentication method, and channel information. The configuration information transmitted through the processing is received by the enrollee. The enrollee having received the information joins the network provided by the external access point based on the configuration information.

<Connection Sequence>

Figure 6:
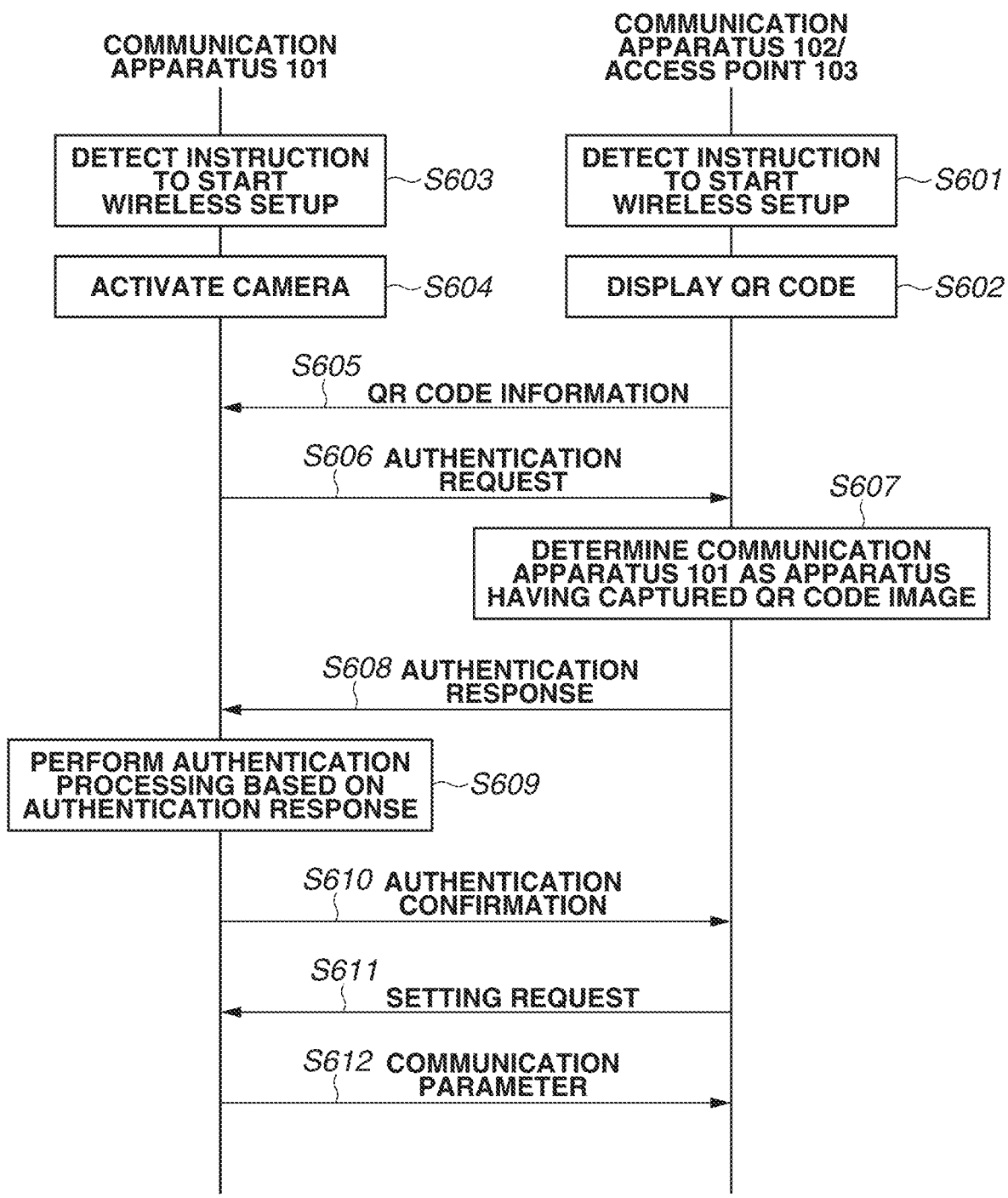
FIG. 6 is a sequence diagram illustrating an example of wireless setup processing.

Next, a process of setup processing will be described below with reference to FIG. 6. FIG. 6 is a sequence diagram illustrating an example of a process that is performed in a case where the communication apparatus 101 is to share communication parameters with the communication apparatus 102 or the access point 103.

According to the present example embodiment, the communication apparatus 101 as a configurator based on the DPP standard provides communication parameters to the communication apparatus 102 or the access point 103 as an enrollee based on the DPP standard.

In sequence 401 (hereinafter, referred to as "step S601"), the communication apparatus 102 detects a user operation of starting a wireless setup. In step S602, after detecting the user operation of starting a wireless setup of the communication apparatus 102, the communication apparatus 102 displays a QR code image including bootstrapping information on the operation unit 211 and waits for an authentication request.

Meanwhile, in step S603, the communication apparatus 101 functioning as a configurator also detects the user operation of starting a wireless setup. The OS of the communication apparatus 101 having detected the user operation of starting a wireless setup starts an operation of the setup processing unit 431. Next, in step S604, the processing unit 431 of the communication apparatus 101 collaborates with the camera control unit 436, activates the camera 418, and changes the camera 418 to a state of being ready to capture images of nearby areas.

Next, in step S605, the camera control unit 436 of the communication apparatus 101 captures image data including the QR code displayed by the communication apparatus 102 in step S602. The two-dimensional code interpretation unit 432 analyzes the captured image data, decodes the information from the QR code, and acquires the bootstrapping information. The information includes at least a public key for use in authentication of the communication apparatus 102. The interpretation unit 432 notifies the processing unit 431 of the acquired information as an analysis result.

Next, in step S606, the processing unit 431 of the communication apparatus 101 generates an authentication request using the public key for authentication acquired as the analysis result and transmits the generated authentication request to the communication apparatus 102. In step S607, the setup processing unit 221 of the communication apparatus 102 collaborates with the TPM 225 and determines, based on the information included in the received authentication request, whether the communication apparatus 101 is an apparatus by which the QR code displayed in step S602 is captured. Specifically, the processing unit 221 collaborates with the TPM 225 and attempts to develop the encoded data included in the authentication request using the secret key for use in DPP. In a case where the encoded data is successfully developed, the setup processing unit 221 determines that the communication apparatus 101 is an apparatus by which the QR code is captured, and the setup processing unit 221 performs step S608 and subsequent steps. On the other hand, in a case where the encoded data is unsuccessfully developed, the setup processing unit 221 determines that the communication apparatus 101 is not an apparatus by which the QR code displayed in step S602 is captured, and the setup processing is ended as an error.

The determination of whether the development is successful includes comparing a hash value of the public key acquired by developing the authentication request and the hash value of the public key (bootstrapping key) for use in DPP that is stored in the TPM 225. Specifically, an apparatus having acquired the authentication key included in the QR code is determined as an apparatus by which the QR code is captured.

Next, the sequence from step S608 will be described below. The processing unit 221 of the communication apparatus 102 generates an authentication response. In step S608, the processing unit 221 collaborates with the wireless communication control unit 223 and transmits the generated authentication response to the communication apparatus 101 being a configurator. After transmitting the authentication response to the communication apparatus 101, the communication apparatus 102 waits for an authentication confirmation from the communication apparatus 101.

In step S609, the setup processing unit 431 of the communication apparatus 101 having received the authentication response transmitted in step S608 collaborates with the TPM 435 and performs authentication processing on the communication apparatus 102 based on the content of the authentication response. In a case where the authentication is successful, the setup processing unit 431 collaborates with the TPM 435 and generates a common encryption key based on the protocol key included in the authentication response.

In step S610, in a case where the communication apparatus 102 is successfully authenticated, the communication apparatus 101 transmits an authentication confirmation to the communication apparatus 102. The communication apparatus 102 having received the authentication confirmation from the communication apparatus 101 performs authentication processing on the communication apparatus 101 based on the content of the authentication confirmation. In a case where the authentication is successful, the processing unit 221 of the communication apparatus 102 generates a common encryption key based on the protocol key. By the sequence of processing described above, the configurator and the enrollee share the common encryption key to enable secure communication.

In step S611, in a case where the authentication is successful, the processing unit 221 of the communication apparatus 102 transmits a setting request to the communication apparatus 101 being a configurator. After transmitting the setting request, the communication apparatus 102 waits for a setting response from the communication apparatus 101.

In step S612, the processing unit 431 of the communication apparatus 101 having received the setting request transmitted in step S611 collaborates with the wireless communication control unit 433 and transmits configuration information for connecting to an external access point to the communication apparatus 102. The communication apparatus 102 having received a setting response attempts to connect to the external access point using the configuration information included in the setting response. For example, in a case where configuration information for connecting to the access point 103 is received, the processing unit 431 attempts to connect to the access point 103. In a case where the connection is successful, the communication apparatus 101 can join the wireless network 104 provided by the access point 103.

The case where the communication apparatus 101 provides configuration information for connecting to an external access point to the communication apparatus 102 is described as an example according to the present example embodiment. Similar processing is performed in a case where the communication apparatus 101 is to provide configuration information to the access point 103. A difference from the sequence of processing illustrated in FIG. 6 is that the configuration information is used in setting an operation setting of the access point 103. Thus, in a case where the communication apparatus 102 as a configurator is to set up an access point, the user is prompted to input information for setting up the access point, such as an SSID and a passkey for use in operations and an encoding method. The communication apparatus 101 generates configuration information including the input information and transmits the generated configuration information to the access point 103. The access point 103 having received the configuration information can form the wireless network 104 using the configuration information received from the communication apparatus 101.

Figure 7:
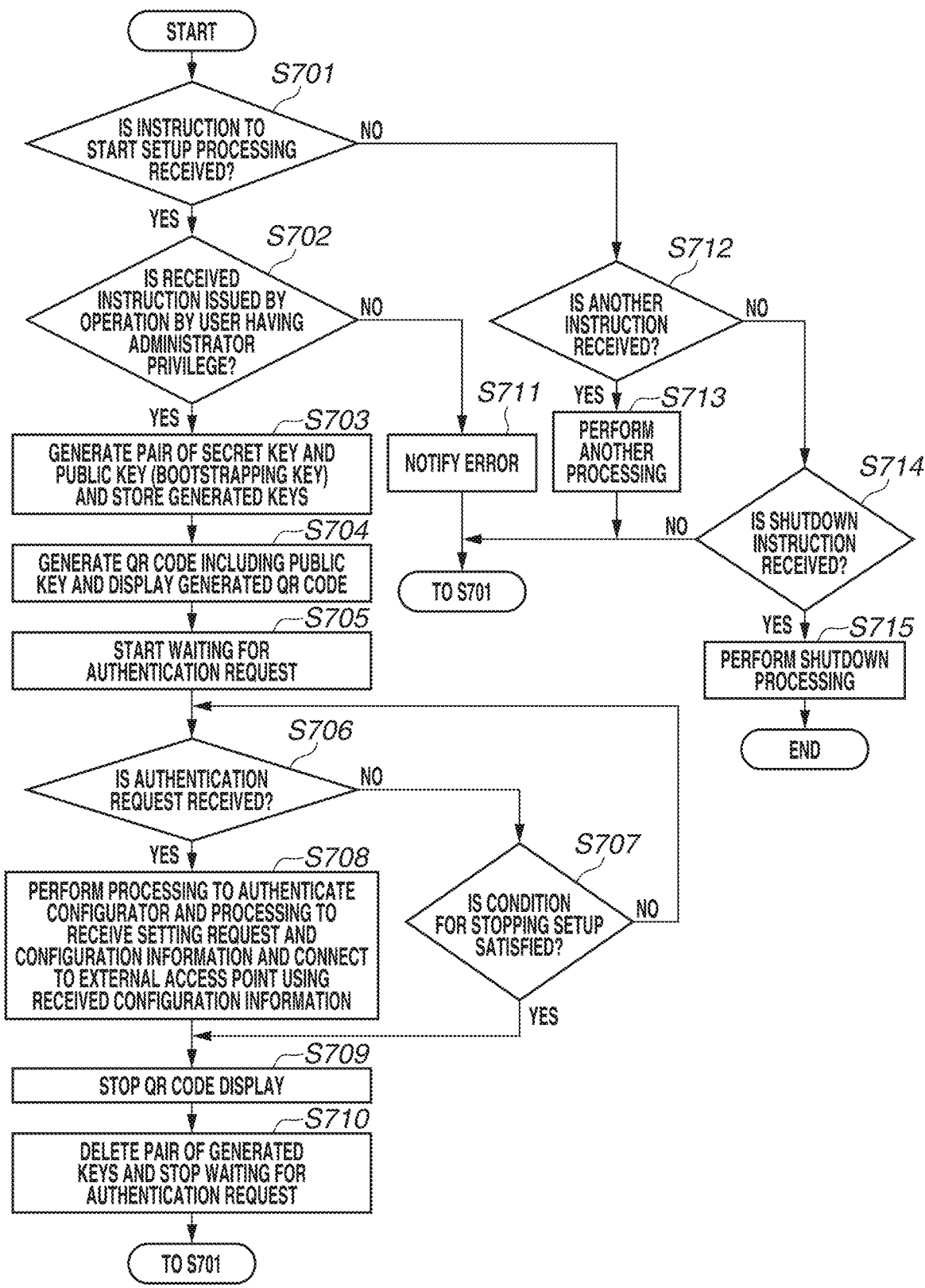
FIG. 7 is a flowchart illustrating an example of a control process performed by a communication apparatus according to a first embodiment.

Next, a method for appropriately generating a pair of a public key and a secret key for use in performing the wireless setup processing based on DPP by the communication apparatus 102 functioning as an enrollee will be described below. A specific process will be described below with reference to a flowchart illustrated in FIG. 7 and a screen illustrated in FIG. 8. FIG. 7 illustrates an example of a flowchart that is performed by the CPU 202 of the communication apparatus 102, and FIG. 8 illustrates an example of a screen that is displayed on the operation unit 211 of the communication apparatus 102.

Each operation (step) in the flowchart in FIG. 7 is realized by the CPU 202 by calling a program for realizing a control module stored in the ROM 204 or the storage 205 to the RAM 203 and executing the program. Data transmission and reception processing is realized in collaboration with the wireless communication I/F 212. Further, in each case where a performer of processing is to be specified clearly, a software module executed by the CPU 202 is described as the subject. The process in FIG. 7 is a process that is performed repeatedly in a case where the communication apparatus 102 is powered on and operates in a normal mode.

In step S701, the CPU 202 determines whether an instruction to start the wireless setup processing based on DPP is received. In a case where an instruction to start the wireless setup processing based on DPP is received (YES in step S701), the processing proceeds to step S702, whereas in a case where an instruction to start the wireless setup processing based on DPP is not received (NO in step S701), the processing proceeds to step S712. The start instruction will be described below with reference to FIG. 8. FIG. 8 illustrates an example of a screen that is displayed on the operation unit 211 after a start instruction is issued.

A key 801 is a key that is used to start the wireless setup processing in a state where the wireless setup processing is not started. A key 802 is a key that is used to end, i.e., stop, the wireless setup processing. In a case where the wireless setup processing is not started, a QR code in an area 803, a message in an area 804, and the key 802 are not displayed.

Specifically, in a case where the wireless setup processing is not started, the key 801 is displayed in a deselected state. A user instruction to select the key 801 is an example of a start instruction according to the present example embodiment. A message such as "SELECT START KEY TO START SETUP PROCESSING" can be displayed in a case where the wireless setup processing is not started.

FIG. 7 will be described further below. First, processing different from the wireless setup processing that the communication apparatus 102 performs will be described below. In step S712, the CPU 202 determines whether another instruction is received. In a case where another instruction is received (YES in step S712), the processing proceeds to step S713, whereas in a case where another instruction is not received (NO in step S712), the processing proceeds to step S714. The "another instruction" herein refers to an instruction other than an instruction to start the wireless setup processing that is described above and a shutdown instruction described below.

In step S713, the CPU 202 performs the other processing. For example, in a case where a copy instruction is received via a copy screen (not illustrated) displayed on the operation unit 211, the CPU 202 performs copy processing in collaboration with the scanner 209 and the printer 207. The CPU 202 reads a document and acquires image data in collaboration with the scanner 209. Next, the CPU 202 prints a print image based on the image data on a sheet and discharges the sheet to a sheet discharge tray (not illustrated) in collaboration with the printer 207. Further, in a case where a file transmission instruction is received via a file transmission function screen (not illustrated), the CPU 202 transmits the image data acquire by reading the document to a destination specified by the user in collaboration with the scanner 209. Examples of another instruction also include a print instruction included in a print job. This will be described specifically below. The wireless communication control unit 223 receives a print job via the wireless communication I/F 212. The received print job is passed to a print module (not illustrated). The print module analyzes the print job and generates a print image. The print module prints the generated print image on a sheet and discharges the sheet to the sheet discharge tray (not illustrated) in collaboration with the printer 207.

Next, in step S714, the CPU 202 determines whether a shutdown instruction is received. In a case where a shutdown instruction is received (YES in step S714), the processing proceeds to step S715, whereas in a case where a shutdown instruction is not received (NO in step S714), the processing returns to step S701, and the CPU 202 waits for another instruction.

In step S715, the CPU 202 performs shutdown processing and changes a power state of the communication apparatus 101 to a shutdown state. After the change to the shutdown state is completed, the process of control ends.

Next, a case where an instruction to start the wireless setup processing is received will be described below. In step S702, in a case where an instruction is received in step S701, the user authentication unit 226 determines whether the instruction is issued by an operation by a user having logged in to the communication apparatus 102 and having an administrator privilege. In a case where the user authentication unit 226 determines that the instruction in step S701 is issued by an operation by the user having the administrator privilege (YES in step S702), the processing proceeds to step S703, whereas in a case where the user authentication unit 226 determines that the instruction in step S701 is issued by an operation not by the user having the administrator privilege (NO in step S702), the processing proceeds to step S711. In step S711, the display control unit 220 provides an error notification (not illustrated). After the notification is completed, the processing returns to step S701, and the CPU 202 waits for a further instruction. As described above, only the user having the administrator privilege is allowed to activate the wireless setup processing to prevent performance of the wireless setup processing that is not intended by the administrator.

In step S703, the setup processing unit 221 collaborates with the TPM 225 and generates a public key for use in DPP and a secret key paired with the public key. The TPM 225 manages the generated public key and the generated secret key.

Next, in step S704, the processing unit 221 transmits a request to generate a QR code for storing bootstrapping information including the public key generated in step S703 to the two-dimensional code generation unit 222. The generation unit 222 having received the request generates a QR code image including the bootstrapping information, stores the generated QR code image in the settings storage unit 224, and notifies the processing unit 221 of the completion of the generation. The processing unit 221 having received the notification collaborates with the display control unit 220 and displays the setting screen including the QR code illustrated as an example in FIG. 8 on the operation unit 211.

The setting screen displayed in step S704 includes the area 803 where the QR code image generated in step S704 is displayed. Further, the setting screen displays a message in the area 804 to prompt the user to scan the QR code with a terminal supporting Wi-Fi Easy Connect™.

Next, in step S705, the processing unit 221 starts waiting for an authentication request. More specifically, the processing unit 221 starts an operation as the network service of waiting in the standby state for an authentication request based on the DPP standard.

In step S706, the processing unit 221 determines whether an authentication request is received. In a case where an authentication request is received (YES in step S706), the processing proceeds to step S708, whereas in a case where an authentication request is not received (NO in step S706), the processing proceeds to step S707. Hereinafter, a case where an authentication request from the communication apparatus 101 having read the QR code displayed in step S704 is received will be described below.

In step S707, the processing unit 221 determines whether a condition for stopping the setup is satisfied. In a case where the processing unit 221 determines that the condition for stopping the setup is satisfied (YES in step S707), the processing proceeds to step S709, whereas in a case where the processing unit 221 determines that the condition for stopping the setup is not satisfied (NO in step S707), the processing returns to step S706, and the processing unit 221 waits for an authentication request.

The condition for stopping will be described specifically below. In a case where the processing unit 221 detects the press of the END key 802 illustrated in FIG. 8, the processing unit 221 determines that the condition for stopping the setup is satisfied.

Further, in a case where the processing unit 221 receives a notification indicating that the user has logged out from the user authentication unit 226, the processing unit 221 determines that the condition for stopping the setup is satisfied. Further, the processing unit 221 monitors whether a predetermined time (e.g., 15 minutes) has elapsed since the display of the setting screen in step S704. In a case where the processing unit 221 determines that the predetermined time has elapsed, the processing unit 221 determines that the condition for stopping the setup is satisfied. With this determination processing, the setup processing can be stopped as appropriate in a case where the setup is started but remains unoperated due to an unknown circumstance or in a case where an operation or an event occurs that can be considered as a stop of the setup by the user.

In step S708, the processing unit 221 performs authentication processing based on the authentication request. Then, the processing unit 221 performs processing to receive a subsequent setting request and configuration information and attempts to connect to an external access point corresponding to the configuration information. In a case where the connection is completed, the processing proceeds to step S708. The processing unit 221 identifies the external access point that is the connection destination using the SSID and the wireless channel information that are included in the configuration information. This processing is performed in collaboration with the wireless communication control unit 223. Next, the processing unit 221 collaborates with the wireless communication control unit 223 and connects to the identified external access point.

In a case where the authentication processing is unsuccessful, which is not illustrated due to sheet limitation, the processing unit 221 returns an error response as a response to the authentication request and does not perform subsequent processing, and the processing proceeds to step S708. With this processing, an authentication request from a configurator without a valid public key is rejected.

In step S709, the CPU 202 stops the display of the QR code image. Specifically, the processing unit 221 collaborates with the display control unit 220 and changes the screen displayed on the operation unit 211 to a screen without the QR code image. For example, in a case where the setup is successful, a screen indicating that the setup is completed is displayed. Further, for example, in a case where the setup is stopped, an unsuccessful screen indicating that the setup is unsuccessful is displayed. The unsuccessful screen can display a cause of the stop. In a case where the setup is stopped because the user has logged out, the login screen for waiting for a user login operation can be displayed instead of the unsuccessful screen.

In step S710, the processing unit 221 collaborates with the TPM 225 and deletes the pair of the public key and the secret key that are generated in step S703. Then, the processing unit 221 stops waiting for an authentication request.

More specifically, the operation as the network service of waiting in the standby state for an authentication request based on the DPP standard is stopped.

By the series of processing described above, a new pair of a secret key and a public key are always generated and are used in DPP in each case where the wireless setup processing based on DPP is to be performed. Further, the pair of the secret key and the public key are appropriately deleted at the time of completing or stopping the wireless setup.

Further, according to the present example embodiment, only the user having the administrator privilege is allowed to display a QR code for bootstrapping and to start the wireless setup processing based on DPP. This reduces the possibility that a third party obtains a public key for DPP through another path. Further, since a new pair of a public key and a secret key are generated at each setup, the setup cannot be performed using a public key that is used in a previous setup.

MODIFIED EXAMPLE OF FIRST EXAMPLE EMBODIMENT

While the case where the QR code image is displayed on the operation unit 211 is described as an example of a method for externally providing bootstrapping information including a DPP public key according to the present example embodiment, the present invention is not limited to the this disclosure. The communication apparatus 102 can output a QR code by controlling the printer 207 and printing an image of the QR code on a sheet. In this case, a configurator can read the QR code image printed on the sheet instead of a displayed QR code image. Further, bootstrapping information can be provided externally using near-field wireless communication. For example, bootstrapping information can be provided externally using a communication method such as near-field communication (NFC) that supports the International Organization for Standardization and the International Electrotechnical Commission (ISO/IEC) 18092 or ISO/IEC 21481 standard. Further, for example, bootstrapping information can be provided externally using a communication method such as Bluetooth® or Bluetooth® Low Energy. A period of externally providing bootstrapping information using NFC or Bluetooth Low Energy can be set similarly to a period of displaying a QR code.

Further, timings of generating or disposing of a pair of a secret key and a public key for DPP are not limited to those illustrated in FIG. 7.

A pair of a public key and a secret key are to be generated as needed in a case where a predetermined condition is satisfied so that the pair of the public key and the secret key are used as one-time keys in the series of the wireless setup processing based on DPP. For example, a pair of keys for use in next or subsequent DPP can be generated at the timing of deleting a pair of keys in step S710. Further, a modification can be made to dispose of only the secret key or only the public key. In a case where the secret key is disposed of, the deriving processing based on an authentication request cannot be performed, so that an effect similar to an effect produced in the case where the pair of the keys are disposed of is produced. In a case where the public key is disposed of, the comparison of hash values in authentication cannot be performed, so that an effect similar to an effect produced in the case where the pair of the keys are disposed of is produced.

Further, the disposal according to the present example embodiment is not limited to the deletion of physical data. Not using the keys in encoding, decoding, signing, and externally providing bootstrapping information also corresponds to the disposal. Specifically, a pair of a different public key and a different secret key are to be used in next and subsequent setups while the public keys and the secret keys that are used previously are prevented from being used.

Similarly, the timing of generating a QR code image can also be changed. For example, a QR code image corresponding to a new public key can be generated at a timing of generating a new pair of the new public key and a secret key. As described above, starting the setup processing and the ending the setup processing are examples of a case where the predetermined condition is satisfied.

While the case where the network service of waiting for an authentication request in the standby state is activated in step S705 and is stopped in step S710 is described as an example according to the present example embodiment, the present invention is not limited to the this disclosure.

The network service can constantly be in the activated state in a case where the communication apparatus 102 operates in the normal mode. In this case, the network service is not stopped at the timing in step S710. Instead, the pair of the public key and the secret key that are used in DPP are disposed of at the timing in step S710, and a new pair of a public key and a secret key are generated at the timing in step S710.

Further, while the case where an error notification is provided in a case where a general-privilege user without the administrator privilege performs an operation of starting a DPP setup is described as an example according to the present example embodiment, the present invention is not limited to the this disclosure. For example, the key 801 can be displayed in a grayed-out state to indicate that the key 801 is not available so that start instructions cannot be issued in a case where a logged-in user is a general-privilege user without the administrator privilege.

According to a second example embodiment, a case where importance is placed on security and a pair of a public key and a secret key are generated and disposed of appropriately so that the pair of the public key and the secret key are used as one-time keys in the series of the wireless setup processing based on DPP is described as an example.

Meanwhile, once the authentication is performed between a configurator and an enrollee using the DPP device authentication system, the configurator and the enrollee can communicate with each other using a common key. The configurator and the enrollee may communicate communication parameters and establish a network for direct wireless communication such as Wi-Fi Direct. Further, a communication partner may be identified using the DPP communication system, and a network for direct wireless communication such as Wi-Fi Direct may be established with the communication partner. In this case, the direct wireless communication is possibly used to communicate print jobs and scan data with the communication apparatus 101.

Thus, a configuration is used so that a user other than a user having the administrator privilege is also allowed to display a QR code for DPP, and the network service of waiting for an authentication request is controlled to be activated constantly.

In this case, disposing of a previously-used public key and a previously-used secret key and generating a new public key and a new secret key as a result of a DPP authentication request being issued or wireless network configuration processing following the DPP authentication request being performed may cause an issue. For example, a device with which Wi-Fi Direct communication is previously established with DPP being a trigger may attempt to re-establish Wi-Fi Direct communication with DPP authentication being a trigger using a previously-used public key. In this case, if the public key and the secret key have been replaced with a new public key and a new secret key, the authentication fails, and the re-connection cannot be established.

Figure 9:
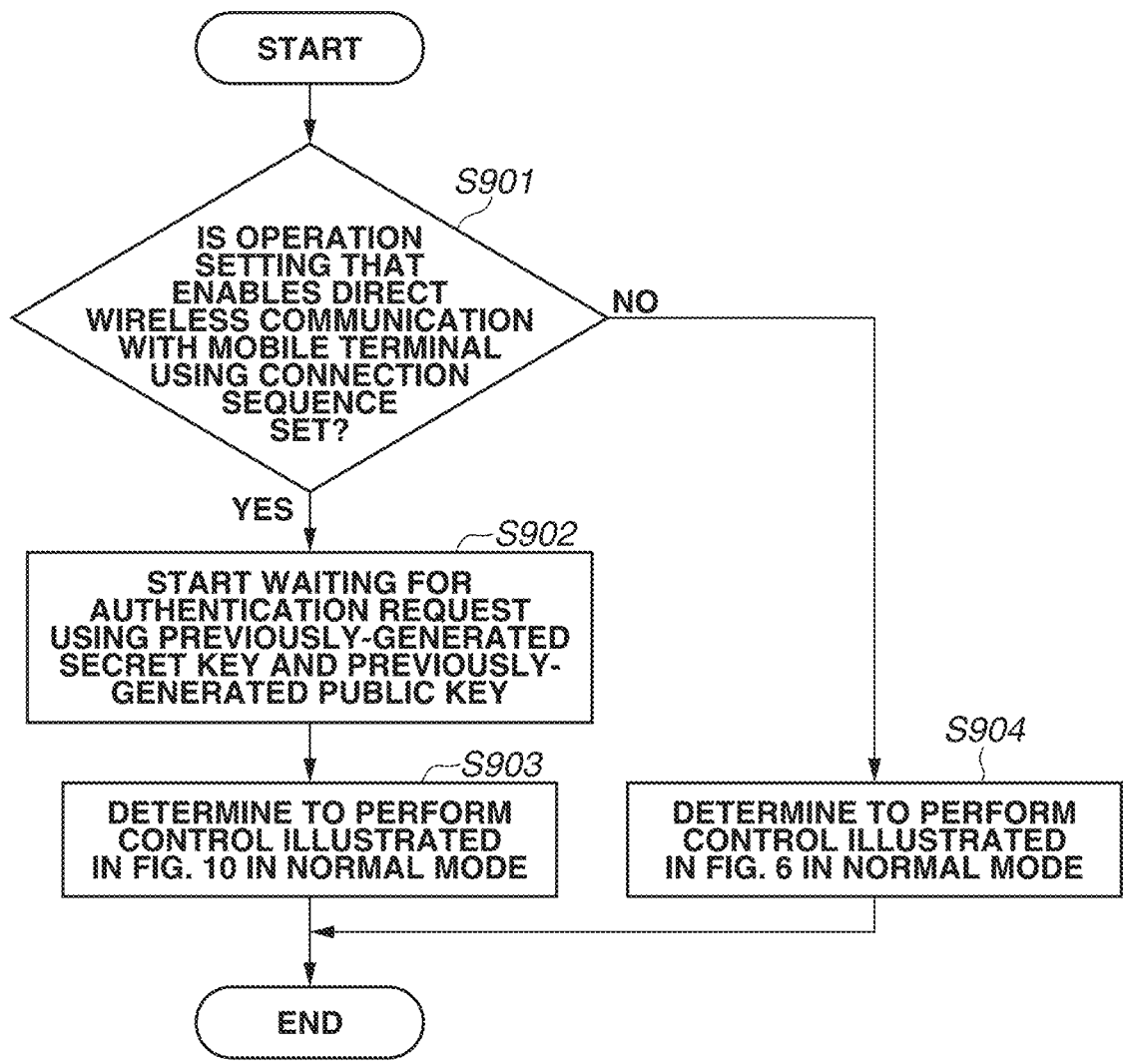
FIG. 9 is a flowchart illustrating an example of an activation control process performed by a communication apparatus according to a second example embodiment.
Figure 10:
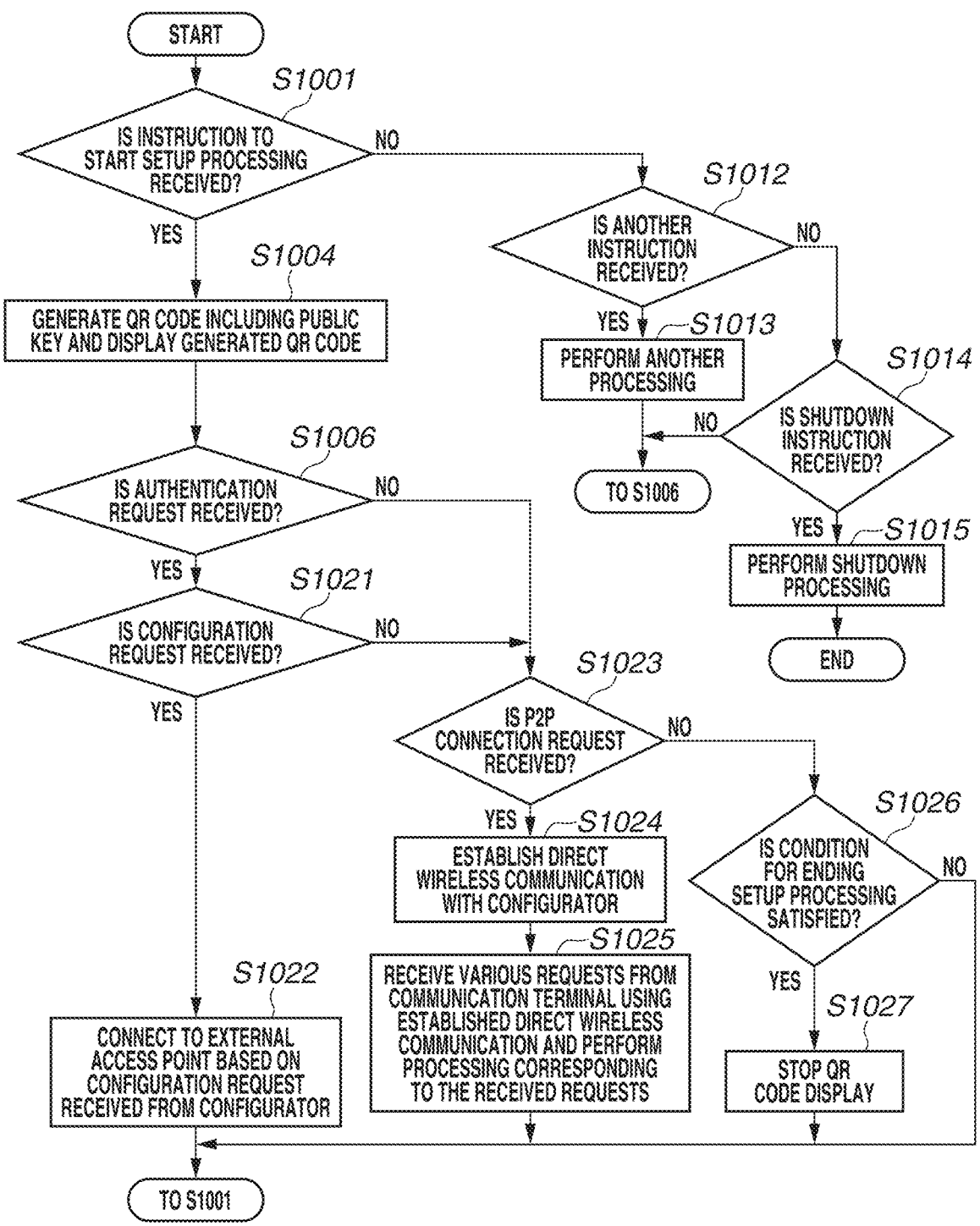
FIG. 10 is a flowchart illustrating an example of a control process performed by the communication apparatus according to the second example embodiment.
Figure 11:
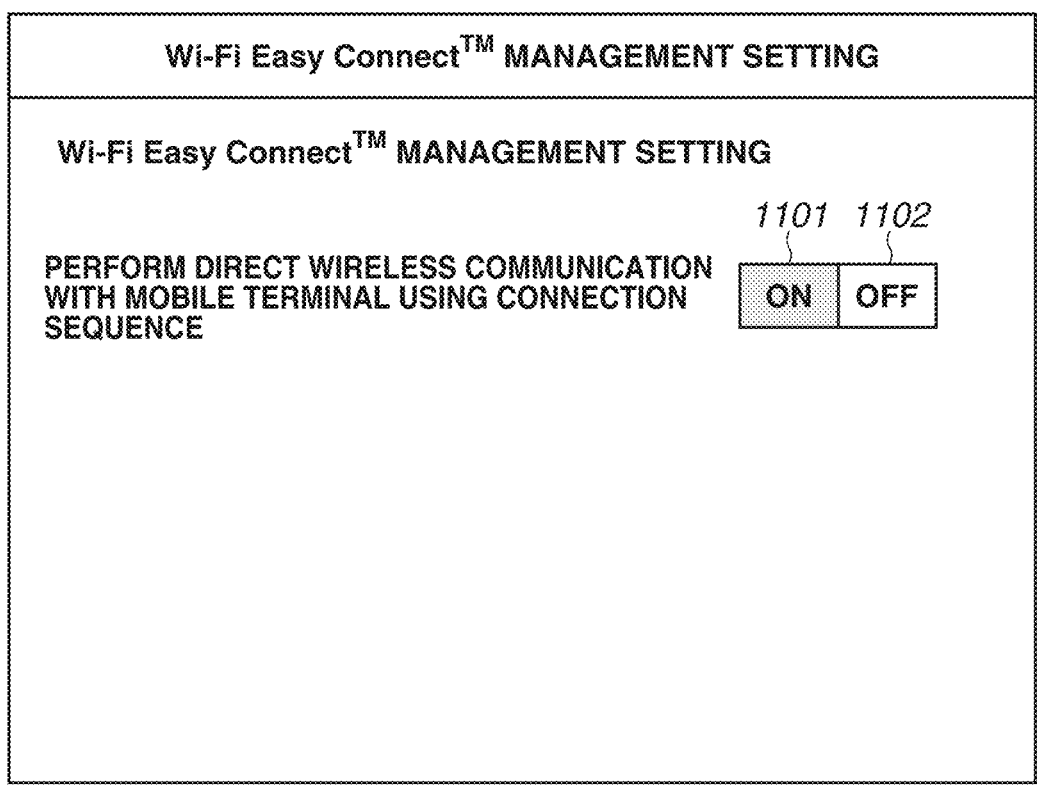
FIG. 11 illustrates an example of a screen displayed on an operation unit of the communication apparatus according to the second example embodiment.

In view of the above-described issue, a system for dynamically selecting whether control for generating a pair of keys as one-time keys and using the pair of the generated keys based on the operation settings is to be performed or control for not updating a pair of keys in order to use DPP as a trigger for direct wireless communication is to be performed is provided according to the second example embodiment. This will be described specifically below. FIGS. 9 and 10 each illustrate an example of a flowchart that is performed by the CPU 202 of the communication apparatus 102, and FIG. 11 illustrates an example of a screen that is displayed on the operation unit 211 of the communication apparatus 102.

Each operation (step) in the flowcharts in FIGS. 9 and 10 are realized by the CPU 202 by calling a program for realizing a control module stored in the ROM 204 or the storage 205 to the RAM 203 and executing the program. Data transmission and reception processing is realized in collaboration with the wireless communication I/F 212. Further, in each case where a performer of processing is to be specified clearly, a software module that is executed by the CPU 202 is described as a subject of a sentence. The process in FIG. 9 is a process of control that relates to DPP and is performed in a case where the communication apparatus 102 is powered on and the activation processing is to be performed. The process in FIG. 10 is a process that is performed repeatedly in a case where the communication apparatus 102 is powered on and operates in a normal mode.

In step S901, the CPU 202 refers to the settings stored in the settings storage unit 224 and determines whether an operation setting that enables the direct wireless communication with a mobile terminal using the connection sequence is set. In a case where the operation setting that enables the direct wireless communication is set (YES in step S901), the processing proceeds to step S902, whereas in a case where the operation setting that enables the direct wireless communication is not set (NO in step S901), the processing proceeds to step S904.

The operation settings will be described below with reference to FIG. 11. FIG. 11 illustrates an example of a setting screen that is displayed on the operation unit 211 to receive the operation settings relating to DPP according to the second example embodiment. Only a user having the administrator privilege is allowed to access the setting screen.

Keys 1101 and 1102 are keys for switching between a setting that enables the direct wireless communication with a mobile terminal using the connection sequence and a setting that disables the direct wireless communication with a mobile terminal using the connection sequence. A case where the setting that enables the direct wireless communication is selected is described as an example according to the present example embodiment. A user having the administrator privilege can select whether to enable or disable the direct wireless communication with a mobile terminal using the connection sequence via the screen. In a case where the key 1101 is selected, the operation setting that enables the direct wireless communication with a mobile terminal using the connection sequence is stored in the settings storage unit 224. On the other hand, in a case where the key 1102 is selected, the operation setting that disables the direct wireless communication with a mobile terminal using the connection sequence is stored in the settings storage unit 224.

In step S902, the setup processing unit 221 activates the network service of waiting for a DPP authentication request and starts waiting for an authentication request using the secret key and the public key for DPP that are previously generated and managed in the TPM 225.

Next, in step S903, the CPU 202 determines to perform an operation illustrated in FIG. 10 in the normal mode. On the other hand, in step S904, the CPU 202 determines to perform the operation illustrated in FIG. 6 in the normal mode according to the first example embodiment.

After changing to the normal mode, the CPU 202 dynamically selects whether to perform the process in FIG. 6 or the process in FIG. 10 based on the operation mode determined in the activation process in FIG. 9.

Next, the operation in FIG. 10 will be described below. The processing in step S1001 is similar to the processing in step S701.

A difference from the first example embodiment is that the processing proceeds to step S1004 without performing the processing of checking the administrator privilege in step S702 and the processing of generating keys in step S703.

In step S1004, the setup processing unit 221 displays a setting screen including a QR code image storing bootstrapping information including a previously-generated public key. The QR code image can be generated at this timing, or a QR code image that is previously generated at the time of generating the public key can be used.

In step S1006, the processing unit 221 determines whether an authentication request is received. This processing is similar to the processing in step S706. In a case where an authentication request is received (YES in step S1006), the processing proceeds to step S1021, whereas in a case where an authentication request is not received (NO in step S1006), the processing proceeds to step S1023.

In step S1021, the processing unit 221 determines whether a configuration request is received from a configurator that is the issuer of the authentication request. In a case where a configuration request is received (YES in step S1021), the processing proceeds to step S1022, whereas in a case where a configuration request is not received (NO in step S1021), the processing proceeds to step S1023.

In step S1022, the processing unit 221 attempts to connect to an external access point based on the configuration request received from the configurator. After the connection is completed, the processing returns to step S1001.

In step S1023, the processing unit 221 determines whether a peer-to-peer (P2P) connection request is received from the configurator. In a case where a P2P connection request is received (YES in step S1023), the processing proceeds to step S1024, whereas in a case where a P2P connection request is not received (NO in step S1023), the processing proceeds to step S1026.

In step S1024, the processing unit 221 establishes direct wireless communication with the configurator that is the transmitter of the P2P connection request. The direct wireless communication can be, for example, wireless communication based on the Wi-Fi Direct standard. While a case where the configurator is a Wi-Fi Direct parent device and the communication apparatus 102 being an enrollee is a Wi-Fi Direct child device is considered according to the present example embodiment, the present invention is not limited to the this disclosure.

The communication apparatus 102 being an enrollee can be a parent device.

In step S1025, the CPU 202 receives various requests from the communication apparatus 101 using the established direct wireless communication. Then, the CPU 202 performs processing corresponding to the received requests. For example, in a case where a print job including a print request is received, the CPU 202 performs processing to print an image on a sheet based on the print job. Further, in a case where, for example, a scan request is received, the CPU 202 performs processing to read a document placed on a platen glass, generate image data, and transmit data based on the generated image data to the communication apparatus 101 that is the issuer of the request. After the collaborative processing with the communication apparatus 101 with which the direct wireless communication is performed is completed, the processing proceeds to step S1001 and the CPU 202 waits for another request.

In step S1026, the processing unit 221 determines whether a condition for ending the setup processing is satisfied. In a case where the processing unit 221 determines that the condition for ending the setup processing is satisfied (YES in step S1026), the processing proceeds to step S1027, whereas in a case where the processing unit 221 determines that the condition for ending the setup processing is not satisfied (NO in step S1026), the processing proceeds to step S1001, and the processing unit 221 waits for another request or another instruction.

In step S1027, the processing unit 221 collaborates with the display control unit 220 and stops the QR code display. This processing is similar to the processing in step S709. After the processing is completed, the processing returns to step S1001, and the processing unit 221 waits for another request or another instruction.

The processing in step S1012 to the processing in step S1015 are similar to the processing in step S712 to the processing in step S715 according to the first example embodiment. A difference from the first example embodiment is that the processing proceeds to step S1006 in a case where other processing is performed or a shutdown instruction is not received.

In a case where the setting that enables the direct wireless communication with a mobile terminal using the connection sequence is stored in the settings storage unit 224, the direct wireless communication with the configurator with DPP being a trigger can be established at any time by the above-described processing.

A P2P connection request can be received as configuration information corresponding to a setting request. In this case, the configurator includes "p2p" in an attribute of a Wi-Fi technology object of the configuration information. Further, the configurator includes parameters for the direct wireless communication as the communication parameters of the configuration information. The communication apparatus 102 having received the configuration information including "p2p" in the attribute of the Wi-Fi technology object sets the operation settings for the direct wireless communication based on the communication parameters included in the configuration information.

According to the above-described example embodiments, a system for appropriately generating a pair of a public key and a secret key for use in sharing communication parameters is provided. Further, the security in sharing the communication parameters is increased.

OTHER EMBODIMENTS

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2021-144485, filed Sep. 6, 2021, which is hereby incorporated by reference herein in its entirety.

What is claimed is:

1. A communication apparatus comprising:
   at least one processor; and
   a memory coupled to the at least one processor, the memory having instructions that, when executed by the processor, causes the at least one processor to function as:
   a generation unit configured to generate, for use in Device Provisional Protocol (DPP) communication, a new pair of a public key and a secret key paired with the public key in a case where a predetermined condition is satisfied;
   a provision unit configured to externally provide information including at least the generated public key;
   a first reception unit configured to receive, from an external apparatus after the information is provided by the provision unit, an authentication request including information generated using at least the public key;
   a transmission unit configured to transmit, to the external apparatus, an authentication response as a response to the authentication request in a case where the authentication request is received;
   a second reception unit configured to receive, from the external apparatus after the authentication response is transmitted to the external apparatus, configuration information including a communication parameter,
   wherein the predetermined condition is satisfied in a case where a user operation of starting wireless setup processing using a specific wireless setup standard is received, and
   wherein in a case where the user operation of starting the wireless setup processing using the specific wireless setup standard is received, the generation unit generates the new pair of the public key and the secret key paired with the public key; and
   a disposal unit configured to dispose of the secret key paired with the public key generated by the generation unit in a case where the wireless setup processing is completed.

2. The communication apparatus according to claim 1, further comprising a connection unit configured to connect to an external access point identified based on the configuration information received by the second reception unit.

3. The communication apparatus according to claim 1, further comprising a display unit,
   wherein the provision unit externally provides the information by displaying a two-dimensional code including the generated public key on the display unit.

4. The communication apparatus according to claim 1, further comprising a printing unit,
   wherein the provision unit externally provides the information by printing an image corresponding to a two-dimensional code on a sheet using the printing unit and outputting the sheet, the two-dimensional code including information including at least the public key generated by the generation unit.

5. The communication apparatus according to claim 3, wherein the two-dimensional code is a quick response code (QR Code®).

6. The communication apparatus according to claim 1, wherein the provision unit externally provides the information including at least the public key using near-field wireless communication.

7. The communication apparatus according to claim 1, wherein the disposal unit disposes of the secret key paired with the public key generated by the generation unit in a case where the wireless setup processing is stopped.

8. The communication apparatus according to claim 1, wherein the information provided by the provision unit further includes information indicating a wireless channel via which the communication apparatus waits for the authentication request.

9. The communication apparatus according to claim 1, further comprising a wireless communication interface,
   wherein the information provided by the provision unit further includes information indicating a media access control (MAC) address of the wireless communication interface of the communication apparatus.

10. A method for controlling a communication apparatus, the method comprising:
    generating a new pair of a public key and a secret key paired with the public key, for use in Device Provisional Protocol (DPP) communication, in a case where a predetermined condition is satisfied;
    externally providing information including at least the generated public key;
    performing first reception control to receive, from an external apparatus after the information is provided, an authentication request including information generated using at least the public key;
    transmitting, to the external apparatus, an authentication response as a response to the authentication request in a case where the authentication request is received; and
    performing second reception control to receive, from the external apparatus after the authentication response is transmitted to the external apparatus, configuration information including a communication parameter,
    wherein the predetermined condition is satisfied in a case where a user operation of starting wireless setup processing using a specific wireless setup standard is received, and
    wherein in a case where the user operation of starting the wireless setup processing using the specific wireless setup standard is received, the generating generates the new pair of the public key and the secret key paired with the public key; and
    disposing of the secret key paired with the public key generated by the generating in a case where the wireless setup processing is completed.

11. A non-transitory computer-readable storage medium that stores a program for causing a computer to execute the method for controlling the communication apparatus according to claim 10.

12. A communication apparatus comprising:
    at least one processor; and
    a memory coupled to the at least one processor, the memory having instructions that, when executed by the processor, causes the at least one processor to function as:
    a provision unit configured to externally provide, after a predetermined user operation is received, information including at least one of a public key and a secret key, the at least one of the public key and the secret key being generated in a case where a predetermined condition is satisfied;

a first reception unit configured to receive, from an external apparatus after the information is provided by the provision unit, an authentication request including information generated using at least the public key and the secret key;
a transmission unit configured to transmit, to the external apparatus, an authentication response as a response to the authentication request in a case where the authentication request is received; and
a second reception unit configured to receive, from the external apparatus after the authentication response is transmitted to the external apparatus, configuration information including a communication parameter,
wherein in a case where a setup based on the communication parameter included in the received configuration information is successful, the public key is not used in the communication apparatus after the successful setup,
wherein the predetermined condition is satisfied in a case where the user operation of starting wireless setup processing using a specific wireless setup standard is received, and
wherein in a case where the user operation of starting the wireless setup processing using the specific wireless setup standard is received, the generation unit generates the new pair of the public key and the secret key paired with the public key; and
a disposal unit configured to dispose of the secret key paired with the public key generated by the generation unit in a case where the wireless setup processing is completed.

13. The method according to claim 10, further comprising connecting to an external access point identified based on the received configuration information.

14. The method according to claim 10, further comprising providing the information by printing an image corresponding to a two-dimensional code on a sheet using a printing unit and outputting the sheet, the two-dimensional code including information including at least the generated public key.

15. The method according to claim 10,
wherein the predetermined condition is satisfied in a case where the user operation of starting wireless setup processing using a specific wireless setup standard is received, and
wherein in a case where the user operation of starting the wireless setup processing using the specific wireless setup standard is received, the generating generates the new pair of the public key and the secret key paired with the public key.

16. The non-transitory computer-readable storage medium according to claim 11, further comprising connecting to an external access point identified based on the received configuration information.

17. The non-transitory computer-readable storage medium according to claim 11, further comprising providing the information by printing an image corresponding to a two-dimensional code on a sheet using a printing unit and outputting the sheet, the two-dimensional code including information including at least the generated public key.

18. The non-transitory computer-readable storage medium according to claim 11,
wherein the predetermined condition is satisfied in a case where the user operation of starting wireless setup processing using a specific wireless setup standard is received, and
wherein in a case where the user operation of starting the wireless setup processing using the specific wireless setup standard is received, the generating generates the new pair of the public key and the secret key paired with the public key.

19. The communication apparatus according to claim 1, wherein the pair of the public key and the secret key are used as one-time keys in a series of a wireless setup processing based on DPP.

20. The communication apparatus according to claim 1, wherein the at least one processor further functions as a processing unit configured to determine whether a peer-to-peer (P2P) connection request is received.

21. The communication apparatus according to claim 20, wherein the connection request is received as the configuration information corresponding to a setting request.

22. The communication apparatus according to claim 20, wherein the processing unit functions as a network service of waiting in a standby state for an authentication request based on a DPP standard.

23. The communication apparatus according to claim 1, wherein the generation unit generates one of identification information and a QR code image storing at least the public key for use in DPP.

* * * * *